United States Patent
No et al.

(10) Patent No.: US 11,558,172 B2
(45) Date of Patent: Jan. 17, 2023

(54) ENCRYPTION METHOD AND APPARATUS BASED ON HOMOMORPHIC ENCRYPTION USING COMPOSITION OF FUNCTIONS

(71) Applicants: SAMSUNG ELECTRONICS CO., LTD., Suwon-si (KR); SNU R&DB FOUNDATION, Seoul (KR); Industry Academic Cooperation Foundation Chosun University, Gwangju (KR)

(72) Inventors: Jong Seon No, Seoul (KR); Yong Woo Lee, Seoul (KR); Eunsang Lee, Seoul (KR); Joon Woo Lee, Seoul (KR); Young Sik Kim, Gwangju (KR)

(73) Assignees: SAMSUNG ELECTRONICS CO., LTD., Suwon-si (KR); SNU R&DB FOUNDATION, Seoul (KR); Industry-Academic Cooperation Foundation Chosun University, Gwangju (KR)

( * ) Notice: Subject to any disclaimer, the term of this patent is extended or adjusted under 35 U.S.C. 154(b) by 0 days.

(21) Appl. No.: 17/236,176

(22) Filed: Apr. 21, 2021

(65) Prior Publication Data
US 2021/0336765 A1 Oct. 28, 2021

Related U.S. Application Data

(60) Provisional application No. 63/021,761, filed on May 8, 2020, provisional application No. 63/013,706, filed on Apr. 22, 2020.

(30) Foreign Application Priority Data
Oct. 26, 2020 (KR) .......................... 10-2020-0139489

(51) Int. Cl.
H04L 9/00 (2022.01)
H04L 9/06 (2006.01)
G06F 7/548 (2006.01)

(52) U.S. Cl.
CPC .............. H04L 9/008 (2013.01); G06F 7/548 (2013.01); H04L 9/0618 (2013.01); H04L 2209/12 (2013.01)

(58) Field of Classification Search
CPC ... H04L 9/008; H04L 9/0618; H04L 2209/12; G06F 7/548
See application file for complete search history.

(56) References Cited

U.S. PATENT DOCUMENTS

2013/0170640 A1\* 7/2013 Gentry .................... H04L 9/008
380/30
2014/0177828 A1\* 6/2014 Loftus ................... H04L 9/0852
380/44
(Continued)

FOREIGN PATENT DOCUMENTS

KR 10-2015-0043062 A 4/2015
KR 10-2015-0083391 A 7/2015
(Continued)

OTHER PUBLICATIONS

Faster bootstrapping with polynomial error J Alperin-Sheriff, C Peikert—Annual Cryptology Conference, 2014—Springer (Year: 2014).\*
(Continued)

*Primary Examiner* — Vu V Tran
(74) *Attorney, Agent, or Firm* — NSIP Law

(57) ABSTRACT

An encryption method and apparatus based on homomorphic encryption using a composition of functions. The encryption method includes generating a ciphertext by encrypting data, and bootstrapping the ciphertext by per-
(Continued)

forming a modular reduction based on a composition of a function for a modulus corresponding to the ciphertext.

17 Claims, 5 Drawing Sheets

(56) References Cited

U.S. PATENT DOCUMENTS

| | | | |
|---|---|---|---|
| 2019/0334694 A1* | 10/2019 | Chen | H04L 9/008 |
| 2020/0228307 A1* | 7/2020 | Cheon | H04L 9/3093 |

FOREIGN PATENT DOCUMENTS

| | | |
|---|---|---|
| KR | 10-1600016 B1 | 3/2016 |
| KR | 10-2017-0142419 A | 12/2017 |
| KR | 10-2018-0013064 A | 2/2018 |
| KR | 10-2018-0092199 A | 8/2018 |
| KR | 10-1965628 B1 | 4/2019 |
| KR | 10-2040106 B1 | 11/2019 |
| KR | 10-2040120 B1 | 11/2019 |

OTHER PUBLICATIONS

Han, Kyoohyung, and Dohyeong, Ki. "Better Bootstrapping for Approximate Homomorphic Encryption." Cryptographers' Track at the RSA Conference. Springer, Cham, 2020 (26 pages in English).

Cheon, Jung Hee, et al. "Bootstrapping for Approximate Homomorphic Encryption." Annual International Conference on the Theory and Applications of Cryptographic Techniques. Springer, Cham, 2018 (21 pages in English).

Chen, Hao, et al. "Improved Bootstrapping for Approximate Homomorphic Encryption." Annual International Conference on the Theory and Applications of Cryptographic Techniques. Springer, Cham, 2019 (21 pages in English).

Cheon, Jung Hee, et al. "Homomorphic Encryption for Arithmetic of Approximate Numbers." International Conference on the Theory and Application of Cryptology and Information Security. Springer, Cham, 2017 (23 pages in English).

Yongsoo Song, "Homomorphic Encryption for Approximate Arithmetic." Dissertation, Department of Mathematical Sciences, Seoul National University, Feb. 2018 (90 pages in English).

Kyoohyung Han, "Bootstrapping Methods for Homomorphic Encryption." Dissertation, Department of Mathematical Sciences, Seoul National University, Feb. 2019 (130 pages in English).

Cheon, J.H. et al., "Bootstrapping for Approximate Homomorphic Encryption", In: Nielsen J., Rijmen V. (eds) Advances in Cryptology—Eurocrypt 2018. Lecture Notes in Computer Science, vol. 10820. Springer, Cham. https://doi.org/10.1007/978-3-319-78381-9 14, 2018, pp. 360-384.

Chen, Hao et al., "Improved Bootstrapping for Approximate Homomorphic Encryption", In: Ishai Y., Rijmen V. (eds) Advances in Cryptology—Eurocrypt 2019. Lecture Notes in Computer Science, vol. 11477. Springer, Cham. https://doi.org/10.1007/978-3-030-17656-3 2, Oct. 28, 2018, pp. 34-54.

Cheon, J.H. et al., "Efficient Homomorphic Comparison Methods with Optimal Complexity", In: Moriai S., Wang H. (eds) Advances in Cryptology—Asiacrypt 2020. Lecture Notes in Computer Science, vol. 12492. Springer, Cham. https://doi.org/10.1007/978-3-030-64834-3 8, Dec. 5, 2020, pp. 221-256.

Extended European search Report dated Aug. 27, 2021, in counterpart European Patent Application No. 21169784.2 (9 pages in English).

* cited by examiner

Algorithm 1

Input: An input domain $[a,b]$, a continuous function $f$ on $[a,b]$, an approximation parameter $\delta$, and generalized polynomial basis $\{g_1, \cdots, g_n\}$.

Output: The minimax approximate generalized polynomial $p$ for $f$

1. Select $x_1, x_2, \cdots, x_{d+2} \in [a,b]$ in strictly increasing order.
2. Find the generalized polynomial $p(x)$ in terms of $\{g_1, \cdots, g_n\}$ with $p(x_i) - f(x_i) = (-1)^i E$ for some $E$.
3. Divide the interval into $n+1$ sections $[z_{i-1}, z_i]$, $i = 1, \cdots, n+1$, from zeros $z_1, \cdots, z_n$ of $p(x) - f(x)$, where $x_i < z_i < x_{i+1}$, and boundary points $z_0 = a, z_{n+1} = b$.
4. Find the maximum (resp. minimum) points for each section when $p(x_i) - f(x_i)$ has positive (resp. negative) value. Denote these extreme points $y_1, \cdots, y_{n+1}$.
5. $\epsilon_{max} \leftarrow \max_i |p(y_i) - f(y_i)|$
6. $\epsilon_{min} \leftarrow \min_i |p(y_i) - f(y_i)|$
7. if $(\epsilon_{max} - \epsilon_{min})/\epsilon_{min} < \delta$ then
8.     return $p(x)$
9. else
10.     Replace $x_i$'s with $y_i$'s and go to line 2.
11. end

FIG. 3

Algorithm 2

Input : An input domain $D = \bigcup_{i=1}^{t}[a_i, b_i] \subset \mathbb{R}$, a piecewise continuous function $f$ on $D$, an approximation parameter $\delta$, and a polynomial basis $\{g_1, \cdots, g_n\}$

Output: The minimax approximate polynomial $p$ for $f$

1. Select $x_1, x_2, \cdots, x_{n+1} \in D$ in strictly increasing order.
2. Find the polynomial $p(x)$ with $p(x_i) - f(x_i) = (-1)^i E$ for some $E$.
3. Gather all extreme and boundary points such that $\mu_{p,f}(x)(p(x) - f(x)) \geq |E|$ into a set $B$.
4. Find $n+1$ extreme points $y_1 < y_2 < \cdots < y_{n+1}$ with alternating condition and maximum absolute sum condition in $B$.
5. $\epsilon_{max} \leftarrow \max_i |p(y_i) - f(y_i)|$
6. $\epsilon_{min} \leftarrow \min_i |p(y_i) - f(y_i)|$
7. if $(\epsilon_{max} - \epsilon_{min})/\epsilon_{min} < \delta$ then
8.     return $p(x)$
9. else
10.     Replace $x_i$'s with $y_i$'s and go to line 2.
11. end

FIG. 4

ENCRYPTION METHOD AND APPARATUS BASED ON HOMOMORPHIC ENCRYPTION USING COMPOSITION OF FUNCTIONS

CROSS-REFERENCE TO RELATED APPLICATIONS

This application claims the benefit under 35 USC 119(e) of U.S. Provisional Application No. 63/013,706 filed on Apr. 22, 2020, and U.S. Provisional Application No. 63/021,761 filed on May 8, 2020, and the benefit under 35 USC 119(a) of Korean Patent Application No. 10-2020-0139489 filed on Oct. 26, 2020, in the Korean Intellectual Property Office, the entire disclosures of which are incorporated herein by reference for all purposes.

BACKGROUND

1. Field

The following description relates to an encryption method and apparatus based on homomorphic encryption using a composition of functions.

2. Description of Related Art

Fully homomorphic encryption is an encryption scheme that enables an arbitrary logical operation or a mathematical operation to be performed on encrypted data. A fully homomorphic encryption method maintains security in data processing.

However, the conventional encryption method is difficult to process encrypted data and thus, inadequate for protecting customer privacy.

Fully homomorphic encryption enables customers to receive many services while preserving privacy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an encryption method using homomorphic encryption includes generating a ciphertext by encrypting data, and bootstrapping the ciphertext by performing a modular reduction based on a composition of a function for a modulus corresponding to the ciphertext.

The bootstrapping may include bootstrapping the ciphertext by approximating the modular reduction based on the function and an inverse function of the function.

The bootstrapping of the ciphertext by approximating the modular reduction based on the function and the inverse function of the function may include obtaining an approximate polynomial of the function, obtaining an approximate polynomial of the inverse function, and generating a composite function that approximates the modular reduction based on a composite function of the approximate polynomial of the function and the approximate polynomial of the inverse function.

The function may include a trigonometric function.

The obtaining of the approximate polynomial of the function may include obtaining, in response to the function being a trigonometric function, a double-angle function of the trigonometric function by applying the double-angle formula to the trigonometric function.

The obtaining of the approximate polynomial of the function may include determining one or more reference points based on a degree of the approximate polynomial, obtaining an arbitrary polynomial based on the one or more reference points, and generating the approximate polynomial of the function based on one or more extreme points selected from the arbitrary polynomial.

The obtaining of the arbitrary polynomial may include obtaining a piecewise continuous function that passes through the one or more reference points, and obtaining the arbitrary polynomial, by generating a polynomial such that absolute values of errors between the polynomial and the piecewise continuous function at the one or more reference points are a specific value.

The obtaining of the arbitrary polynomial by generating the polynomial may include obtaining the arbitrary polynomial, by generating a polynomial such that a first error at a first reference point included in the one or more reference points and a second error at a second reference point adjacent to the first reference point are different in sign, and absolute values of the first and second errors are the specific value.

The generating of the approximate polynomial based on the one or more extreme points selected from the arbitrary polynomial may include obtaining candidate points whose absolute values are greater than or equal to a predetermined value among extreme points of errors between the arbitrary polynomial and a piecewise continuous function that passes through the one or more reference points, selecting target points from among the candidate points, where the number of target points is based on the degree of the approximate polynomial, and generating the approximate polynomial based on the target points.

In another general aspect, an encryption apparatus using homomorphic encryption includes a processor configured to generate a ciphertext by encrypting data, and bootstrap the ciphertext by performing a modular reduction based on a composition of a function for a modulus corresponding to the ciphertext, and a memory configured to store instructions to be executed by the processor.

The processor may be configured to bootstrap the ciphertext by approximating the modular reduction based on the function and an inverse function of the function.

The processor may be configured to obtain an approximate polynomial of the function, obtain an approximate polynomial of the inverse function, and generate a composite function that approximates the modular reduction based on a composite function of the approximate polynomial of the function and the approximate polynomial of the inverse function.

The function may include a trigonometric function.

The processor may be configured to obtain, in response to the function being a trigonometric function, a double-angle function of the trigonometric function by applying the double-angle formula to the trigonometric function.

The processor may be configured to determine one or more reference points based on a degree of the approximate polynomial, obtain an arbitrary polynomial based on the one or more reference points, and generate the approximate polynomial of the function based on one or more extreme points selected from the arbitrary polynomial.

The processor may be configured to obtain a piecewise continuous function that passes through the one or more reference points, and obtain the arbitrary polynomial, by generating a polynomial such that absolute values of errors between the polynomial and the piecewise continuous function at the one or more reference points are a specific value.

The processor may be configured to obtain the arbitrary polynomial, by generating a polynomial such that a first error at a first reference point included in the one or more reference points and a second error at a second reference point adjacent to the first reference point are different in sign, and absolute values of the first and second errors are the specific value.

The processor may be configured to obtain candidate points whose absolute values are greater than or equal to a predetermined value among extreme points of errors between the arbitrary polynomial and a piecewise continuous function that passes through the one or more reference points, select target points from among the candidate points, where the number of target points is based on the degree of the approximate polynomial, and generate the approximate polynomial based on the target points.

Other features and aspects will be apparent from the following detailed description, the drawings, and the claims.

BRIEF DESCRIPTION OF THE DRAWINGS

FIG. 3 illustrates an example of an algorithm for obtaining an approximate polynomial for a function and an inverse function thereof by the encryption apparatus of FIG. 1.

FIG. 4 illustrates an example of an algorithm for obtaining an approximate polynomial for a function and an inverse function thereof by the encryption apparatus of FIG. 1.

Figure 1:
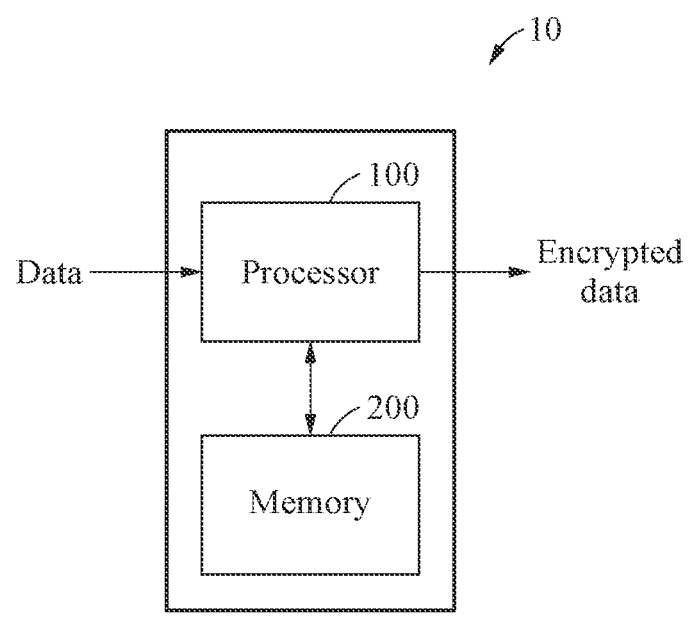
FIG. 1 illustrates an example of an encryption apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of an encryption apparatus.

Referring to FIG. 1, an encryption apparatus 10 may encrypt data. The encryption apparatus 10 may generate encrypted data through encryption of data. Hereinafter, the encrypted data may be referred to as a ciphertext.

The encryption apparatus 10 may perform encryption and decryption using homomorphic encryption. The encryption apparatus 10 may provide an encryption technique for performing an operation on data encrypted using homomorphic encryption without decryption. For example, the encryption apparatus 10 may decrypt a result of operating data encrypted using homomorphic encryption, thereby deriving the same result as an operation on data of a plain text. The encryption apparatus 10 may provide homomorphic encryption operations for real or complex numbers.

The encryption apparatus 10 may perform bootstrapping required for homomorphic encryption. The encryption apparatus 10 may generate an approximate polynomial that approximates a function corresponding to a modular reduction required for homomorphic encryption.

The encryption apparatus 10 may find a minimax approximation error for each degree of an optimal minimax approximate polynomial.

The encryption apparatus 10 may find an approximate polynomial that optimally approximates a modular reduction operation, thereby providing excellent performance in terms of the minimax approximation error of homomorphic encryption.

The encryption apparatus 10 may generate an approximate polynomial that approximates the modular reduction function based on approximation region information for approximating the modular reduction function. The encryption apparatus 10 may perform modular reduction based on a composition of a function. The encryption apparatus 10 may perform bootstrapping by performing modular reduction based on the composition of the function.

The encryption apparatus 10 includes a processor 100 and a memory 200.

The processor 100 may process data stored in the memory. The processor 100 may execute a computer-readable code (for example, software) stored in the memory 200 and instructions triggered by the processor 100.

The "processor 100" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 100 may generate a ciphertext by encrypting data. The data may be information in the form of characters, numbers, sounds, or pictures that may be processed by a computer.

The processor 100 may bootstrap the ciphertext by performing a modular reduction based on a composition of a function for a modulus corresponding to the generated ciphertext.

The processor 100 may perform bootstrapping by approximating the modular reduction based on the function and an inverse function of the function. The processor 100 may obtain an approximate polynomial of the function. The processor 100 may obtain an approximate polynomial of the inverse function.

The processor 100 may determine one or more reference points based on a degree of the approximate polynomial. The processor 100 may obtain an arbitrary polynomial based on the one or more reference points. The processor 100 may obtain a piecewise continuous function that passes through the one or more reference points. The processor 100 may obtain the arbitrary polynomial, by generating a polynomial such that absolute values of errors between the polynomial and the piecewise continuous function at the one or more reference points are a predetermined value.

The processor 100 may obtain the arbitrary polynomial, by generating a polynomial such that an error at a first reference point included in the one or more reference points and an error at a second reference point adjacent to the first reference point are different in sign, and absolute values of the errors are the predetermined value.

The processor 100 may generate the approximate polynomial based on one or more extreme points selected from the arbitrary polynomial. The processor 100 may obtain candidate points whose absolute values are greater than or equal to a predetermined value among extreme points of errors between the arbitrary polynomial and the piecewise continuous function that passes through the one or more reference points.

The processor 100 may select target points from among the candidate points, where the number of target points is based on the degree of the approximate polynomial. The processor 100 may generate the approximate polynomial based on the target points.

The processor 100 may obtain an approximate polynomial of at least one of the function and the inverse function thereof, and perform modular reduction by performing a composition of a function based on the obtained approximate polynomial. The process of obtaining the approximate polynomials of the function and the inverse function thereof will be described in detail with reference to FIGS. 3 and 4.

The processor 100 may generate a composite function that approximates the modular reduction based on a composite function of the approximate polynomial of the function and the approximate polynomial of the inverse function. In this case, the function may include a trigonometric function. For example, the trigonometric function may include at least one of a sine function and a cosine function.

In response to the function being a trigonometric function, the processor 100 may obtain a double-angle function of the trigonometric function by applying the double-angle formula to the trigonometric function.

The memory 200 may store instructions (or programs) executable by the processor. For example, the instructions may include instructions to perform an operation of the processor and/or an operation of each element of the processor.

The memory 200 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
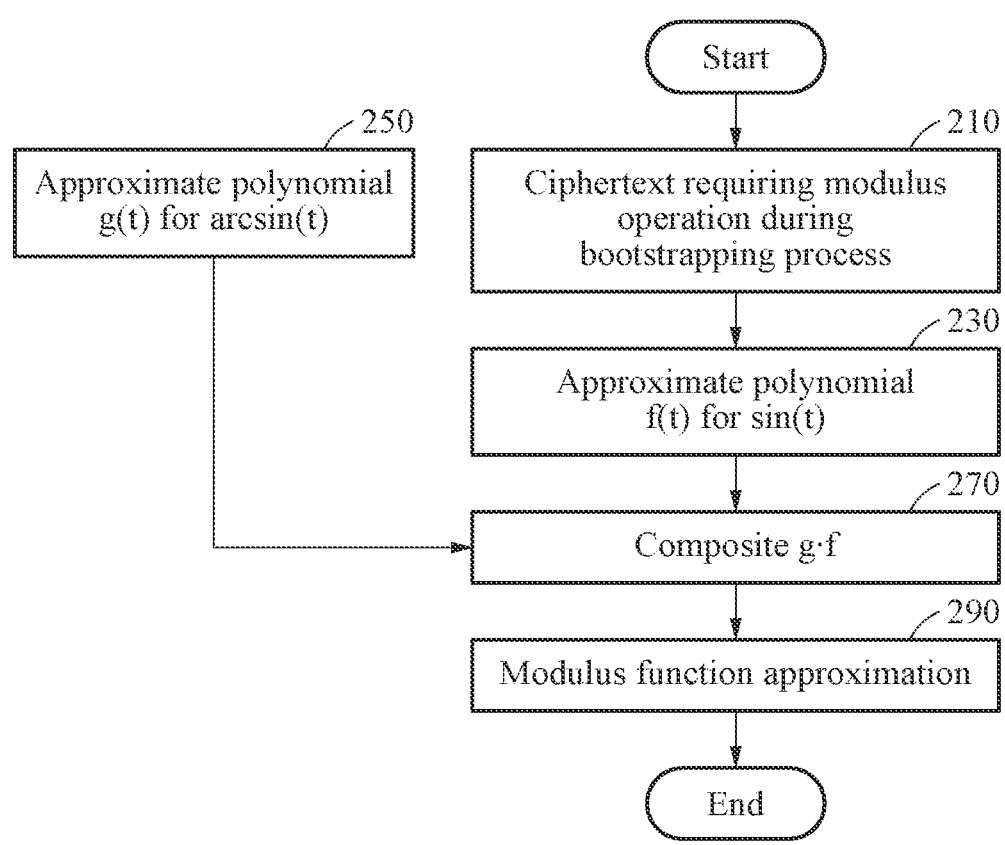
FIG. 2 illustrates an example of obtaining an approximation function by the encryption apparatus of FIG. 1.

FIG. 2 illustrates an example of obtaining an approximation function by the encryption apparatus of FIG. 1.

Referring to FIG. 2, the processor 100 may perform bootstrapping by approximating a modular reduction function. In operation 210, the processor 100 may detect a ciphertext that requires a modulus operation (for example, a modulus reduction operation) during the bootstrapping process. For example, the processor 100 may detect a ciphertext on which an operation cannot be performed any further due to its modulus being less than or equal to a threshold point.

The processor 100 may approximate a modular reduction function to perform bootstrapping. The processor 100 may obtain an approximate polynomial of an arbitrary function and obtain an approximate polynomial of an inverse function. For example, the arbitrary function may include a trigonometric function.

The example of FIG. 2 shows a case in which the arbitrary function is a sine function. However, the modular reduction function may be approximated in the same manner, even if the arbitrary function is a cosine function.

The processor 100 may generate a composite function that approximates the modular reduction based on a composite function of the approximate polynomial of the function and the approximate polynomial of the inverse function. The processor 100 may approximate a modular reduction function through a composition of polynomials with relatively low degree.

For example, in operation 230, the processor 100 may obtain an approximate polynomial f(t) for sin(t). In operation 250, the processor 100 may obtain an approximate polynomial g(t) for arcsin(t). The process of obtaining the approximate polynomials will be described in detail with reference to FIGS. 3 and 4.

In operation 270, the processor 100 may obtain g f(t) by composing the obtained g(t) and f(t). In operation 290, the processor 100 may approximate a modulus function (for example, a modular reduction function) based on a composite function.

The processor 100 may approximate the modulus function with a composite function of a trigonometric function and an inverse trigonometric function, thereby reducing errors compared to approximating the modulus function using only a trigonometric function.

The processor 100 uses the modular reduction function based on the composition of the approximate polynomials of the function and the inverse function thereof, thereby reducing fundamental errors caused by an approximation using only a trigonometric function. The processor 100 may reduce the number of nonscalar multiplications by applying the double-angle formula of a trigonometric function. Through the composition of the function and the inverse function thereof, the processor 100 may reduce the number of operations for the approximation function.

If a function f is a sine function and a function g is an arcsine function, the two functions may be defined as in Equations 1 and 2.

$$f : \bigcup_{k=-\infty}^{\infty} [2\pi(k-\epsilon), 2\pi(k+\epsilon)] \to [-\sin 2\pi\epsilon, \sin 2\pi\epsilon], \quad \text{[Equation 1]}$$

$$f(x) = \sin x$$

$$g : [-\sin 2\pi\epsilon, \sin 2\pi\epsilon] \to [-2\pi\epsilon, 2\pi\epsilon], \, g(x) = \arcsin x \quad \text{[Equation 2]}$$

Here, $\epsilon$ may be in the range of $0 < \epsilon < \frac{1}{4}$.

A composite function for the functions of Equations 1 and 2 may be expressed by Equation 3.

$$x - 2\pi \cdot \text{round}\left(\frac{x}{2\pi}\right) = (g \circ f)(x), \quad \text{[Equation 3]}$$

$$x \in \bigcup_{k=-\infty}^{\infty} [2\pi(k-\epsilon), 2\pi(k+\epsilon)]$$

Here, when substituting $$t = \frac{x}{2\pi},$$

the composite function may be expressed by Equation 4.

$$nor\,\text{mod}(t) = \frac{1}{2\pi}(g \circ f)(2\pi t), \, t \in \bigcup_{k=-\infty}^{\infty} [k-\epsilon, k+\epsilon]. \quad \text{[Equation 4]}$$

Here, normod(t) denotes a normalized modular reduction function. Referring to Equations 1 to 4, the processor 100 may approximate the functions f and g through approximate polynomials and compose the functions, thereby reducing errors in the modular reduction function.

The processor 100 may approximate g(x) with a linear polynomial even for relatively small $\epsilon$. For example, the processor 100 may approximate g(x) with x, that is, an identity function.

Further, a cosine function is a parallel shift of the sine function. Thus, the processor 100 may perform the same composition of functions for the cosine function as well.

If the arbitrary function is an odd function, an approximate polynomial thereof may also be an odd function. That is, if the inverse function is an arcsine function, an approximate polynomial of the arcsine function may be an odd function.

Thus, since the approximate polynomial of the arcsine function among the polynomials of degree less than or equal to two is a linear polynomial, error function between the approximate polynomial and the arcsine function may have four global extreme points that satisfy the Chebyshev alternating theorem.

The processor 100 may obtain a minimax approximate polynomial $c_{min}$ in for the arcsine function in an interval $[-\sin \epsilon, \sin \epsilon]$, as expressed by Equation 5.

$$c_{min} = 1 + \frac{\epsilon^2}{8} + O(\epsilon^4) \quad \text{[Equation 5]}$$

In addition, the relationship in Equation 6 may be satisfied.

$$\frac{\|(1 + \epsilon^2/8)x - \arcsin x\|_\infty}{\|x - \arcsin x\|_\infty} = \quad \text{[Equation 6]}$$

$$\frac{\|c_{min} x - \arcsin x\|_\infty}{\|x - \arcsin x\|_\infty} + O(\epsilon^2) = \frac{1}{4} + O(\epsilon^2)$$

In this example, the domain of all functions may be $[-\sin \epsilon, \sin \epsilon]$.

If $f(x) = \sin x$ and $$g(x) \approx \left(1 + \frac{\pi^2}{2}\epsilon^2\right)x,$$

the normalized modular reduction function in Equation 4 may be evaluated as in Equation 7.

$$normod(t) \approx \frac{1}{2\pi}\left(1 + \frac{\pi^2}{2}\epsilon^2\right)\sin(2\pi t) = \frac{1}{2\pi} g_0(\sin 2\pi t) \quad \text{[Equation 7]}$$

Here, the minimax linear polynomial of g(x) may be $$g_0(x) = \left(1 + \frac{\pi^2}{2}\epsilon^2\right)x.$$

This is just a multiplication of a constant $$1 + \frac{\pi^2}{2}\epsilon^2$$

at the original approximation formula. Thus, the processor 100 may reduce the fundamental limitation of the approximation error for the cosine approximation by $\frac{1}{4}$.

Through this, the processor 100 may obtain 2 more-bit precision by only adjusting the multiplicative factor.

Equations 5 to 7 describe a case in which the degree of the approximate polynomial of the inverse function is one, and the processor 100 may approximate the degree of the approximate polynomial of the inverse function to 2 or higher, thereby further reducing the minimax error.

The processor 100 may perform approximation by increasing the degree of the approximate polynomial to 3, as expressed by Equation 8.

$$g(x) \approx c_1 x + c_3 x^3 = g_1(x) \qquad \text{[Equation 8]}$$

Here, the process of obtaining coefficients $c_1$ and $c_3$ of the polynomial will be described with reference to FIG. 3. By applying Equation 8 to Equation 4, a normalized modular reduction function as shown in Equation 9 may be obtained.

$$normod(t) \approx \frac{1}{2\pi}(c_1 \sin 2\pi t + c_3 \sin^3 2\pi t) \qquad \text{[Equation 9]}$$

To approximate the modular reduction function, the processor 100 may approximate the sine or cosine function with a minimax approximate polynomial, and then approximate of Equation 8. The processor 100 may apply the double-angle formula for the approximation of the sine or cosine function.

The application of the double-angle formula requires two more nonscalar multiplications and two more depths after the sine or cosine function is approximated. Through the double-angle formula, the minimax approximation error for the normalized modular reduction function may have a value between $\delta_0$, which is the approximation flat error when the degree of the approximate polynomial of the inverse function is 1 and $\delta_1$, which is the minimax approximation error when the modular reduction function is approximated using Equation 8.

If $g_n(x)$ denotes the optimal minimax approximate polynomial of degree $2n+1$ for $g(x)$, $g_n(x)$ may have only odd degree terms. Hereinafter, $\delta_n$ may be the minimax approximation error of $g_n(x)$.

To obtain the minimax approximation error between $\delta_n$ and $\delta_{n+1}$, the processor 100 may obtain a normalized modular reduction function expressed by Equation 10.

$$normod(t) \approx \frac{1}{2\pi} g_n(\sin 2\pi t) \qquad \text{[Equation 10]}$$

Here, $\delta_n$ may go to zero as n increases. The processor 100 may reduce the approximation error through the composition of approximation functions of a trigonometric function and an inverse trigonometric function.

Hereinafter, the process of obtaining the approximate polynomials of the function and the inverse function thereof will be described in detail with reference to FIGS. 3 and 4.

FIG. 3 illustrates an example of an algorithm for obtaining an approximate polynomial for a function and an inverse function thereof by the encryption apparatus of FIG. 1.

Referring to FIG. 3, the processor 100 may obtain an approximate polynomial of a function and/or an approximate polynomial of an inverse function of the function. The processor 100 may obtain the approximate polynomial of the function and/or the approximate polynomial of the inverse function thereof by using Algorithm 1 of FIG. 3.

The processor 100 may obtain an approximate polynomial of at least one of the function and the inverse function thereof. The approximate polynomial of the function and the approximate polynomial of the inverse function thereof may be obtained through the same process.

The processor 100 may generate an approximate polynomial by finding a minimax approximate polynomial for any continuous function on an interval [a, b] using Algorithm 1 of FIG. 3. The processor 100 may use Chebyshev alternation theorem to generate an approximate polynomial satisfying equioscillation condition.

The processor 100 may generate an approximate polynomial whose basis function $\{g_1, \ldots, g_n\}$ satisfies the Haar condition. To generate an approximate polynomial of degree d, the processor 100 may select the basis function $\{g_1, \ldots, g_n\}$ by the power basis $\{1, x, \ldots x^d\}$. Here, n=d+1.

The processor 100 may determine one or more reference points based on the degree d of an approximate polynomial to be obtained. The processor 100 may initialize the set of reference points that are converged to the extreme points of the minimax approximate polynomial. The processor 100 may obtain the minimax approximate polynomial in regard to the set of reference points. Since the set of reference points is the set of finite points in [a, b], it may be a closed subset of [a, b], and thus Chebyshev alternation theorem may be satisfied for the set of reference points.

The processor 100 may obtain an arbitrary polynomial based on the one or more reference points. The processor 100 may obtain a piecewise continuous function that passes through the one or more reference points. The processor 100 may obtain the arbitrary polynomial, by generating a polynomial such that absolute values of errors between the polynomial and the piecewise continuous function at the one or more reference points are a predetermined value.

The processor 100 may obtain the arbitrary polynomial, by generating a polynomial such that an error at a first reference point included in the one or more reference points and an error at a second reference point adjacent to the first reference point are different in sign, and absolute values of the errors are the predetermined value.

$f(x)$ may be the piecewise continuous function that passes through the one or more reference points. When $f(x)$ is a continuous function on [a, b], the minimax approximate polynomial on the set of reference points may be a generalized polynomial p(x) with the basis $\{g_1, \ldots, g_n\}$ satisfying the condition of Equation 11 for some E. The value of E may be the predetermined value described above.

$$p(x_i) - f(x_i) = (-1)^i E \quad i=1, \ldots, d+2 \qquad \text{[Equation 11]}$$

The processor 100 may obtain an arbitrary polynomial p(x) using Equation 11. According to Equation 11, a system of linear equations having n+1 equations and n+1 variables of n coefficients of p(x) and E, and the linear equations are not singular by the Haar condition, and thus the processor 100 may obtain the polynomial p(x) satisfying the condition of Equation 11.

The processor 100 may generate the approximate polynomial based on one or more extreme points selected from the arbitrary polynomial. In detail, the processor 100 may obtain candidate points whose absolute values are greater than or equal to a predetermined value among extreme points of errors between the arbitrary polynomial and the piecewise continuous function that passes through the one or more reference points. The processor 100 may select target points from among the candidate points, where the number of target points is based on the degree of the approximate polynomial. The processor 100 may generate the approximate polynomial based on the selected target points.

The processor 100 may obtain n zeros $z_i$ of $p(x)-f(x)$ between $x_i$ and $x_{i+1}$ if $z_0=a$, $z_{n+1}=b$, and i=1, 2, \ldots, n, may obtain n+1 extreme points $y_1, \ldots, y_{n+1}$ of p(x)-f(x) in each $[z_{i-1}, z_i]$.

The processor 100 may select the minimum point of $p(x)-f(x)$ in $[z_{i-1}, z_i]$ if $p(x_i)-f(x_i)<0$, and select the maximum point of $p(x)-f(x)$ in $[z_{i-1}, z_i]$ if $p(x_i)-f(x_i)>0$.

Through this, the processor 100 may select a new set of extreme points $y_1, \ldots, y_{n+1}$ as candidate points. If these candidate points satisfy equioscillation condition, the processor 100 may generate an approximate polynomial of a function or an inverse function thereof by returning a minimax approximate polynomial from the Chebyshev alternation theorem.

Further, the processor 100 may replace a set of reference points with the new set of extreme points $y_1, \ldots, y_{n+1}$ obtained through the above process, and iteratively perform the polynomial generating process described above.

Algorithm 1 shown in FIG. 3 may be extended to the multiple sub-intervals of an interval. When Algorithm 1 extended to the multiple sub-intervals is applied, steps 3 and 4 of FIG. 3 may be changed.

For each iteration, the processor 100 may obtain all local extreme points of an error function p−f whose absolute error values may be larger than the absolute error values at the current reference points.

Then, the processor 100 may select, from among all of the obtained local extreme points, n+1 new extreme points satisfying the following two criteria:
1. The error values alternate in sign; and
2. A new set of extreme points includes the global extreme point.

The above two criteria may ensure the convergence to the minimax generalized polynomial.

FIG. 4 illustrates an example of an algorithm for obtaining an approximate polynomial for a function and an inverse function thereof by the encryption apparatus of FIG. 1.

Referring to FIG. 4, the processor 100 may obtain an approximate polynomial of a function and/or an approximate polynomial of an inverse function of the function by using Algorithm 2.

The function to be obtained through approximation by the processor 100 may be a normalized modular reduction function defined in only near finitely many integers as expressed by Equation 12.

$$normod(x) = x - \text{round}(x), \quad x \in \bigcup_{i=-(K-1)}^{K-1} [i-\epsilon, i+\epsilon] \quad \text{[Equation 12]}$$

Equation 12 may express the modular reduction function scaled for both its domain and range.

The processor 100 may use the cosine function to approximate normod(x) to use double-angle formula for efficient homomorphic evaluation.

If the double-angle formula is used l times, the cosine function in Equation 13 may need to be approximated.

$$\cos\left(\frac{2\pi}{2^l}\left(x - \frac{1}{4}\right)\right), \quad x \in \bigcup_{i=-(K-1)}^{K-1} [i-\epsilon, i+\epsilon] \quad \text{[Equation 13]}$$

To approximate the piecewise continuous functions including the functions of Equations 12 and 13, the processor 100 may assume a general piecewise continuous function defined on a union of finitely many closed intervals, which is given as Equation 14.

$$D = \bigcup_{i=1}^{t} [a_i, b_i] \subset [a, b] \subset \mathbb{R} \quad \text{[Equation 14]}$$

Here, $a_i < b_i < a_{i+1} < b_{i+1}$ for all $i=1, \ldots, t-1$.

To approximate a given piecewise continuous function with a polynomial having a degree less than or equal to d on D of Equation 14, the processor 100 may set a criterion for selecting new d+2 reference points from among multiple extreme points.

The processor 100 may generate an approximate polynomial by using $\{g_1, \ldots, g_n\}$ satisfying the Haar condition on [a, b] as the basis of polynomial. The processor 100 may obtain the minimax approximate polynomial in regard to the set of reference points for each iteration, and select a new set of reference points for next iteration.

There may be many cases where the processor 100 selects n+1 points from among extreme points of an error function evaluated using the arbitrary polynomial obtained using the set of reference points. The processor 100 may consider many intervals during the encryption process, and thus there may be lots of candidate extreme points.

The processor 100 may select n+1 target points from among many candidate points for each iteration to minimize the number of iterations. Through this, the processor 100 may generate the minimax approximate polynomial by converging the approximate polynomial generated for each iteration. In this example, the finally generated minimax approximate polynomial may be the approximate polynomial of the function and/or the approximate polynomial of the inverse function thereof described above.

In order to set the criterion for selecting n+1 target points, the processor 100 may define the function of Equation 15.

$$\mu_{p,f}(x) = \quad \text{[Equation 15]}$$
$$\begin{cases} 1 & p(x) - f(x) \text{ is a local maximum value at } x \text{ on } D \\ -1 & p(x) - f(x) \text{ is a local minimum value at } x \text{ on } D, \\ 0 & \text{otherwise} \end{cases}$$

Here, denotes an arbitrary polynomial obtained in each iteration, and $f(x)$ denotes a piecewise continuous function to be approximated. For convenience, $\mu_{p,f}$ may be hereinafter referred to as $\mu$.

The processor 100 may obtain all extreme points of $p(x)-f(x)$ into a set B. B may be a finite set and expressed as $B=\{x_1, x_2, \ldots, x_m\}$. The processor 100 may select a point in an interval in B.

Assuming that B is ordered in increasing order, $x_1 < x_2 < \ldots < x_m$, then the values of $\mu$ may be 1 or −1. The number of extreme points may satisfy $m \geq n+1$.

The processor 100 may define a set of functions S as expressed by Equation 16.

$$S=\{\sigma:[n+1] \to [m] | \sigma(i+1) \text{ for all } i=1, \ldots, n\} \quad \text{[Equation 16]}$$

In this example, the set S may include only the identity function if n+1=m.

The processor 100 may set three criteria for selecting n+1 extreme points.

The processor 100 may set a local extreme value condition as the first condition. If E is the absolute error at the set reference points, the condition of Equation 17 may be set.

$$\min_i \mu(x_{\sigma(i)})(p(x_{\sigma(i)}) - f(x_{\sigma(i)})) \geq E \qquad \text{[Equation 17]}$$

To satisfy the local extreme value condition, the processor 100 may remove the extreme points if the local maximum value of p(x)−ƒ(x) is negative or the local minimum value of p(x)−ƒ(x) is positive.

Secondly, the processor 100 may set an alternating condition. In other words, the condition of Equation 18 may be set. In detail, if one of two adjacent extreme points has a local maximum value, the other extreme point may have a local minimum value.

$$\mu(x_{\sigma(i)}) \cdot \mu(x_{\sigma(i+1)}) = -1 \text{ for } i=1, \ldots, n. \qquad \text{[Equation 18]}$$

Thirdly, the processor 100 may set a maximum absolute sum condition. The processor 100 may select σ maximizing the value of Equation 19 from among σ satisfying the local extreme value condition and the alternating condition.

$$\sum_{i=1}^{n+1} |p(x_{\sigma(i)}) - f(x_{\sigma(i)})| \qquad \text{[Equation 19]}$$

The absolute error value at current reference points $x_1, \ldots, x_{n+1}$ may be less than the minimax approximation error, and converge to the minimax approximation error as the number of iterations increases.

Further, the absolute error value at the current reference points may be a weighted average of the absolute error values of the approximate polynomial in the previous iteration at $x_1, \ldots, x_{n+1}$.

The processor 100 may help for the absolute error value at the current reference points to converge to the minimax approximation error fast, using the maximum absolute sum condition.

The local extreme value condition and the alternating condition may be applied to both the algorithms of FIGS. 3 and 4 (Algorithm 1 and Algorithm 2), and the maximum absolute sum condition may be applied to Algorithm 2 of FIG. 4. The processor 100 may apply the maximum absolute sum condition, thereby expediting the convergence to the minimax approximate polynomial.

The set S always contains at least one element $\sigma_0$ that satisfies the local extreme value condition and the alternating condition, and may have $\sigma_0(i_0)$ satisfying $|p(x_{\sigma_0(i_0)}) - f(x_{\sigma_0(i_0)})| = \|p - f\|_\infty$ for some $i_0$.

The processor 100 may more efficiently perform steps 2, 3, and 4 of Algorithm 2 of FIG. 4 as follows. The processor 100 may find coefficients of the approximate polynomial with a power basis at the current reference points for the continuous function ƒ(x).

That is, the processor 100 may generate an approximate polynomial by obtaining the values of the coefficient $c_j$ in Equation 20.

$$\sum_{j=0}^{d} c_j x_i^j - f(x_i) = (-1)^i E \qquad \text{[Equation 20]}$$

Here, E may be an unknown in a linear equation. As the degree of basis of an approximate polynomial increases, the coefficients may decrease. The processor 100 may need to set a higher precision for the coefficients of a higher degree basis.

Thus, the processor 100 may effectively solve the precision problem by using the basis of Chebyshev polynomials as the basis of the approximate polynomial. Since the coefficients of a polynomial with the Chebyshev basis usually have almost the same order, the processor 100 may generate the approximate polynomial using the Chebyshev basis instead of the power basis.

The Chebyshev polynomials satisfy the Haar condition described above, and the processor 100 may obtain the approximate polynomial by calculating and $c_j$ by solving the system of d+2 linear equations of Equation 21 using d+2 reference points.

$$\sum_{j=0}^{d} c_j T_j(x_i) - f(x_i) = (-1)^i E \qquad \text{[Equation 21]}$$

Figure 5:
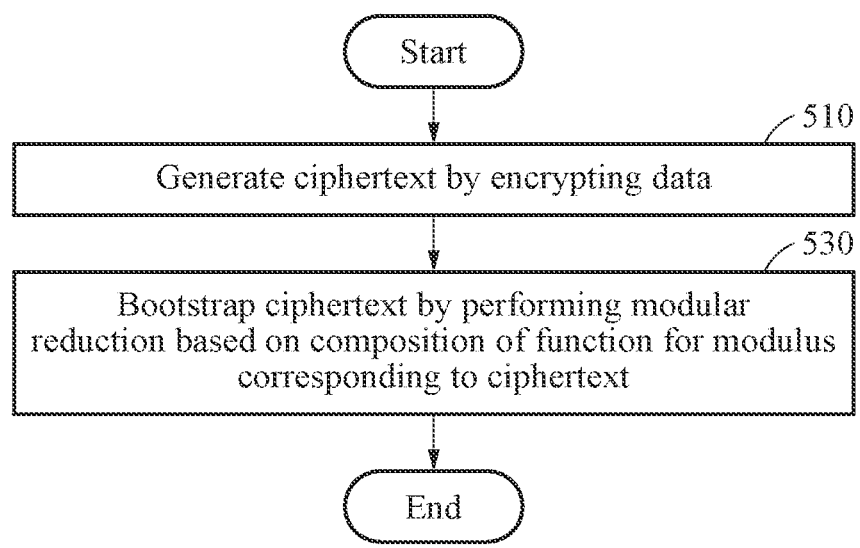
FIG. 5 illustrates an example of an operation of the encryption apparatus of FIG. 1.

FIG. 5 illustrates an example of an operation of the encryption apparatus of FIG. 1.

Referring to FIG. 5, in operation 510, the processor 100 may generate a ciphertext by encrypting data. In operation 530, the processor 100 may bootstrap the ciphertext by performing a modular reduction based on a composition of a function for a modulus corresponding to the ciphertext. In this case, the function may include a trigonometric function.

The processor 100 may perform bootstrapping by approximating the modular reduction based on the function and an inverse function of the function. The processor 100 may obtain an approximate polynomial of the function and obtain an approximate polynomial of the inverse function.

The processor 100 may determine one or more reference points based on a degree of the approximate polynomial, and obtain an arbitrary polynomial based on the one or more reference points.

The processor 100 may obtain a piecewise continuous function that passes through the one or more reference points, and obtain the arbitrary polynomial, by generating a polynomial such that absolute values of errors between the polynomial and the piecewise continuous function at the one or more reference points are a predetermined value.

The processor 100 may obtain the arbitrary polynomial, by generating a polynomial such that an error at a first reference point included in the one or more reference points and an error at a second reference point adjacent to the first reference point are different in sign, and absolute values of the errors are the predetermined value.

The processor 100 may generate the approximate polynomial based on one or more extreme points selected from the arbitrary polynomial. The processor 100 may obtain candidate points whose absolute values are greater than or equal to a predetermined value among extreme points of errors between the arbitrary polynomial and the piecewise continuous function that passes through the one or more reference points, and select target points from among the candidate points, where the number of target points is based on the degree of the approximate polynomial.

The processor 100 may generate the approximate polynomial of the function or the inverse function thereof based on the selected target points.

The processor 100 may generate a composite function that approximates the modular reduction based on a composite function of the approximate polynomial of the function and the approximate polynomial of the inverse function. In this example, in response to the function being a trigonometric function, the processor 100 may obtain a double-angle function of the trigonometric function by applying the double-angle formula to the trigonometric function.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An encryption method using homomorphic encryption, the encryption method comprising:
   generating a ciphertext by encrypting data; and
   bootstrapping the ciphertext by performing a modular reduction based on a composition of a function for a modulus corresponding to the ciphertext,
   wherein the bootstrapping comprises bootstrapping the ciphertext by approximating the modular reduction based on the function and an inverse function of the function.

2. The encryption method of claim 1, wherein the bootstrapping of the ciphertext by approximating the modular reduction based on the function and the inversefunction of the function comprises:
   obtaining an approximate polynomial of the function;
   obtaining an approximate polynomial of the inverse function; and
   approximating the modular reduction based on a composite function of the approximate polynomial of the function and the approximate polynomial of the inverse function.

3. The encryption method of claim 2, wherein the obtaining of the approximate polynomial of the function comprises obtaining, in response to the function being a trigonometric function, a double-angle function of the trigonometric function by applying the double-angle formula to the trigonometric function.

4. The encryption method of claim 2, wherein the obtaining of the approximate polynomial of the function comprises:
   determining one or more reference points based on a degree of the approximate polynomial;
   obtaining an arbitrary polynomial based on the one or more reference points; and
   generating the approximate polynomial of the function based on one or more extreme points selected from the arbitrary polynomial.

5. The encryption method of claim 4, wherein the obtaining of the arbitrary polynomial comprises:
   obtaining a piecewise continuous function that passes through the one or more reference points; and
   obtaining the arbitrary polynomial by generating a polynomial such that absolute values of errors between the polynomial and the piecewise continuous function at the one or more reference points are a specific value.

6. The encryption method of claim 5, wherein the obtaining of the arbitrary polynomial by generating the polynomial comprises obtaining the arbitrary polynomial by generating a polynomial such that a first error at a first reference point included in the one or more reference points and a second error at a second reference point adjacent to the first reference point are different in sign, and absolute values of the first and second errors are the specific value.

7. The encryption method of claim 4, wherein the generating of the approximate polynomial based on the one or more extreme points selected from the arbitrary polynomial comprises:
   obtaining candidate points whose absolute values are greater than or equal to a specific value among extreme points of errors between the arbitrary polynomial and a piecewise continuous function that passes through the one or more reference points;
   selecting target points from among the candidate points, where the number of target points is based on the degree of the approximate polynomial; and
   generating the approximate polynomial based on the target points.

8. The encryption method of claim 1, wherein the function comprises a trigonometric function.

9. A non-transitory computer-readable storage medium storing instructions that, when executed by a processor, cause the processor to perform the encryption method of claim 1.

10. An encryption apparatus using homomorphic encryption, the encryption apparatus comprising:
    a processor configured to generate a ciphertext by encrypting data, and to bootstrap the ciphertext by performing a modular reduction based on a composition of a function for a modulus corresponding to the ciphertext; and a memory configured to store instructions to be executed by the processor, wherein the processor is configured to bootstrap the ciphertext by approximating the modular reduction based on the function and an inverse function of the function.

11. The encryption apparatus of claim 10, wherein the processor is configured to:

obtain an approximate polynomial of the function, obtain an approximate polynomial of the inverse function, and approximating the modular reduction based on a composite function of the approximate polynomial of the function and the approximate polynomial of the inverse function.

12. The encryption apparatus of claim 11, wherein the processor is configured to obtain, in response to the function being a trigonometric function, a double-angle function of the trigonometric function by applying the double-angle formula to the trigonometric function.

13. The encryption apparatus of claim 11, wherein the processor is configured to:

determine one or more reference points based on a degree of the approximate polynomial, obtain an arbitrary polynomial based on the one or more reference points, and generate the approximate polynomial of the function based on one or more extreme points selected from the arbitrary polynomial.

14. The encryption apparatus of claim 13, wherein the processor is configured to:

obtain a piecewise continuous function that passes through the one or more reference points, and obtain the arbitrary polynomial by generating a polynomial such that absolute values of errors between the polynomial and the piecewise continuous function at the one or more reference points are a specific value.

15. The encryption apparatus of claim 14, wherein the processor is configured to obtain the arbitrary polynomial by generating a polynomial such that a first error at a first reference point included in the one or more reference points and a second error at a second reference point adjacent to the first reference point are different in sign, and absolute values of the first and second errors are the specific value.

16. The encryption apparatus of claim 13, wherein the processor is configured to:

obtain candidate points whose absolute values are greater than or equal to a specific value among extreme points of errors between the arbitrary polynomial and a piecewise continuous function that passes through the one or more reference points, select target points from among the candidate points, where the number of target points is based on the degree of the approximate polynomial, and generate the approximate polynomial based on the target points.

17. The encryption apparatus of claim 10, wherein the function comprises a trigonometric function.

* * * * *